US007868845B2

(12) United States Patent
Gratton et al.

(10) Patent No.: US 7,868,845 B2
(45) Date of Patent: Jan. 11, 2011

(54) SECURING RING AND ASSEMBLIES

(75) Inventors: Max S. Gratton, Lakewood, CO (US); Morgan Kirby, Palmer Lake, CO (US)

(73) Assignees: DISH Network L.L.C., Englewood, CO (US); EchoSTar Technologies L.L.C., Englewood, CO (US)

( * ) Notice: Subject to any disclaimer, the term of this patent is extended or adjusted under 35 U.S.C. 154(b) by 414 days.

(21) Appl. No.: 12/127,170

(22) Filed: May 27, 2008

(65) Prior Publication Data

US 2009/0295677 A1 Dec. 3, 2009

(51) Int. Cl.
*H01Q 1/12* (2006.01)

(52) U.S. Cl. ........................ 343/878; 343/907; 343/915

(58) Field of Classification Search ................. 343/878, 343/907, 912, 915; 411/517, 518
See application file for complete search history.

(56) References Cited

U.S. PATENT DOCUMENTS 2,550,554 A * 4/1951 Griffin ........................ 224/197
3,028,993 A 4/1962 Muhlhoff
4,926,181 A * 5/1990 Stumm .......................... 342/5
5,006,243 A 4/1991 Arnaud
5,617,107 A * 4/1997 Fleming ..................... 343/704
5,620,209 A 4/1997 Sauer
5,829,106 A * 11/1998 Dams et al. ................... 24/270
6,065,920 A 5/2000 Becker et al.

* cited by examiner

*Primary Examiner*—Douglas W Owens
*Assistant Examiner*—Dieu Hien T Duong
(74) *Attorney, Agent, or Firm*—Max S. Gratton

(57) ABSTRACT

Various embodiments of a securing ring are described along with assemblies utilizing the securing ring. A securing ring includes a curvilinear body defining an opening and having a gap that defines confronting ring ends that are separable to receive at least one curvilinear device within the opening. The curvilinear body includes an outer surface and opposing first and second side walls that define a slot therebetween. The slot is configured for receiving the curvilinear device, and the outer surface, the first wall and the second wall provide a clamping force on the curvilinear device in the slot when the confronting ring ends are drawn together, with the clamping force securing the curvilinear device within the slot. The securing apparatus further includes a locking mechanism coupled to the confronting ring ends and configured to releasably engage the confronting ring ends to secure the confronting ring ends together.

19 Claims, 6 Drawing Sheets

100A 304 306 302 106 112 114 110 108 102 402 412 416 400 404 408 414 410 406 dish NETWORK®

SECURING RING AND ASSEMBLIES

BACKGROUND

With the increasing popularity of satellite television, satellite antenna reflectors are becoming a common sight in neighborhoods. Satellite antenna reflectors are commonly mounted on rooftops of homes, and regardless of the satellite television provider, are generally similar in appearance and color. Reflector covers have been developed to allow individuals to customize the appearance of their satellite antenna reflectors. Reflector covers are typically made of plastic and molded to fit the contours of a satellite antenna reflector. These reflector covers often have a logo or other design printed on the displayable surface, such as the logo of a company or of a football team. Because satellite antenna reflectors are mounted outside and exposed to the elements, they are designed to withstand fierce winds of up to 155 MPH. However, reflector covers are attached to a satellite antenna reflector using doubled sided adhesive tape. Double sided adhesive tape is inadequate for withstanding high winds encountered in many locations where satellite antenna reflectors are installed. As a result, the satellite antenna reflectors may blow away when exposed to these high winds.

BRIEF DESCRIPTION OF THE DRAWINGS

The same number represents the same element or same type of element in all drawings.

DETAILED DESCRIPTION

The various embodiments described herein generally provide apparatus for securing two or more elements using a securing ring. More particularly, the various embodiments described herein provide a securing ring with a body having opposing segments that separate to form a gap. The body may be a unitary material or may comprise multiple segments coupled by a hinge. The gap opens to allow the body to receive one or more elements, and the body includes a slot that clamps one or more elements within the body. In short, the various embodiments described herein provide a securing ring and assemblies incorporating the securing ring.

In at least one embodiment, the securing ring is utilized to secure a reflector cover to a satellite antenna reflector. The segments of the body of the securing ring are configured to separate to form a gap for receiving the satellite antenna reflector and the reflector cover within the body of the securing ring. More particularly, the satellite antenna reflector and the reflector cover are inserted into a slot of the body, and the segments of the securing ring are moved into a closed position to secure the satellite antenna reflector and the reflector cover. The body exerts a clamping force on the satellite antenna reflector and the reflector cover while in the closed position, securing the reflector cover to the satellite antenna reflector.

Figure 1:
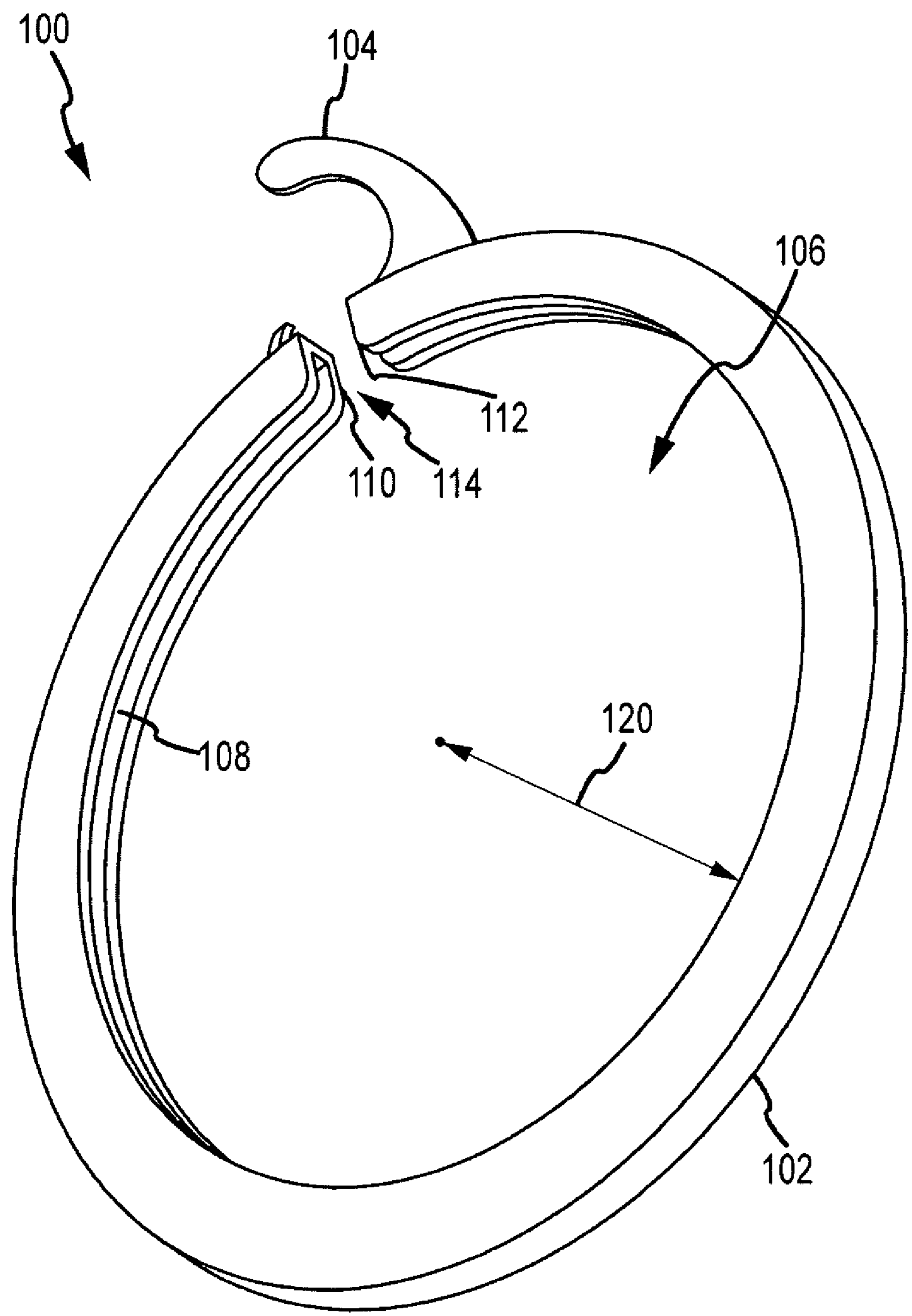
FIG. 1 illustrates an embodiment of a securing ring.

FIG. 1 illustrates an embodiment of a securing ring 100. The securing ring 100 is configured to secure one or more elements within the securing ring 100. The securing ring includes a curvilinear body 102 and a locking mechanism 104. Each of these elements will be discussed in greater detail below.

The curvilinear body 102 has a generally circular or generally elliptical shape which defines a ring opening 106 with an opening diameter 120. The opening diameter 120 is less than the diameter of the curvilinear elements to be secured to provide a lip the holds the curvilinear devices in place within the securing ring 100. The shape of the curvilinear body 102 may be selected based on elements to be secured by the securing ring 100. In at least one embodiment, the curvilinear body 102 has a unitary body. A unitary curvilinear body 102 may be formed from any appropriate material capable of providing a desired clamping force on an element or elements to be secured by the curvilinear body 102. Exemplary materials utilized for forming the curvilinear body 102 include metal, plastic and rubber.

The material forming the curvilinear body 102 may be selected based on various design criteria, such a desired clamping force, elements to be secured therebetween and installation requirements. For example, the curvilinear body 102 may comprise a relatively rigid material, such as metal, to provide a greater clamping force on elements secured therebetween. By contrast, the curvilinear body 102 may be formed from more flexible materials, such as plastic or rubber, to provide greater flexibility of the curvilinear body 102 during installation of elements within the curvilinear body 102. In other words, the curvilinear body 102 may be formed from flexible materials to allow an installer to more easily bend and maneuver the curvilinear body 102 in order to place elements within the securing ring 100 as well as to route the curvilinear body 102 around various shaped flange curvatures of the elements secured therebetween.

The curvilinear body 102 has a gap 114 that separates the opposing segments of the curvilinear body 102. The gap 114 defines confronting ring ends 110 and 112 of the curvilinear body 102. The confronting ring ends 110 and 112 are separable to receive one or more curvilinear devices (not shown in FIG. 1) within the ring opening 106 of the curvilinear body 102.

The curvilinear body 102 further includes a slot 108 formed around the ring opening 106. The slot 108 is configured for receiving one or more curvilinear devices. The securing ring 100 is moveable to an open position, as illustrated in FIG. 1, where the gap 114 is formed for receiving curvilinear devices within the curvilinear body 102. More particularly, the curvilinear devices are placed within the slot 108 when the securing ring 100 is in an open position. The securing ring 100 is also moveable into a closed position that closes the gap 114. When the gap 114 is closed, the slot 108 exerts a clamping force on the curvilinear devices placed within the curvilinear body 102, securing the curvilinear device within the slot 108.

Figure 2:
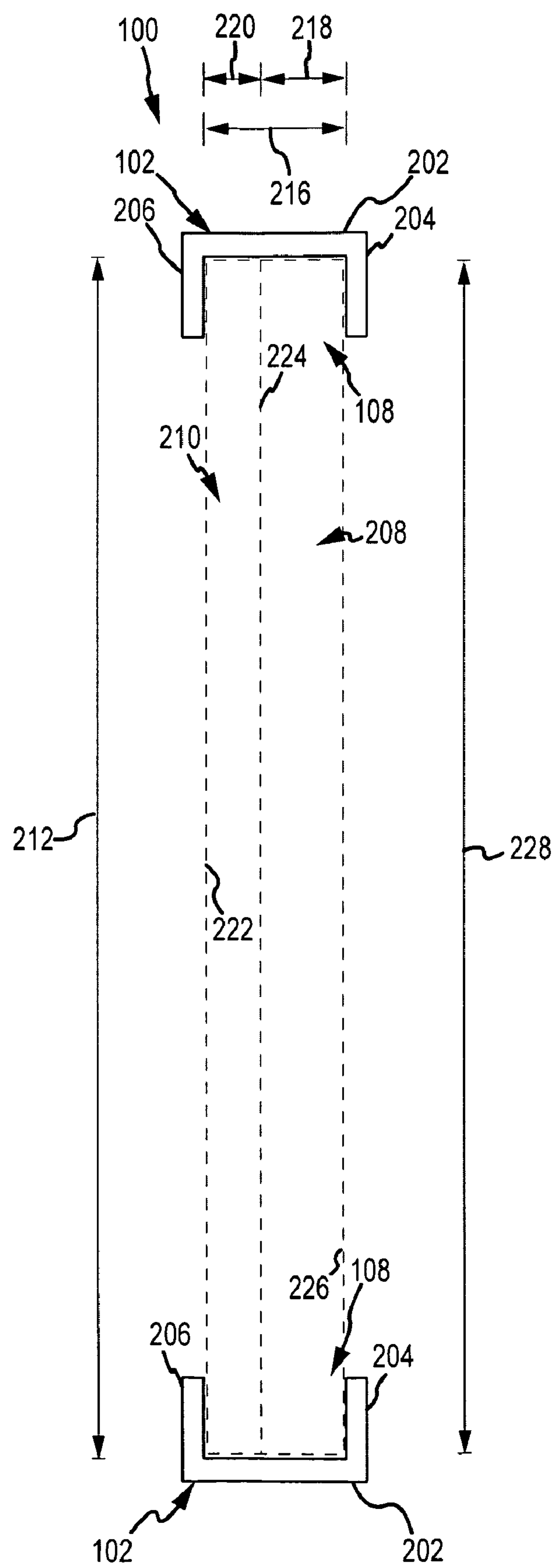
FIG. 2 illustrates a side view of the securing ring of FIG. 1.

FIG. 2 illustrates a side view of the securing ring 100 of FIG. 1. More particularly, FIG. 2 illustrates a side view of the slot 108. FIG. 2 illustrates two curvilinear devices, including a satellite antenna reflector 208 and a satellite reflector cover 210, secured together by the securing ring 100. However, it is to be appreciated that any type of curvilinear device may be secured by the securing ring 100.

The slot 108 is comprised of an outer surface 202, a first side wall 204 and a second side wall 206. When engaged with the satellite antenna reflector 208 and the satellite reflector cover 210, the outer surface 202, the first side wall 204 and the second side wall 206 provide a clamping force on the satellite antenna reflector 208 and the satellite reflector cover 210. Because the satellite antenna reflector 208 and a satellite reflector cover 210 are surrounded by the slot 108 along the outer diameters 212 of the satellite antenna reflector 208 and/or a satellite reflector cover 210 when the securing ring 100 is in a closed position, the satellite antenna reflector 208 and a satellite reflector cover 210 are secured together within the securing ring 100. In at least one embodiment, an inside diameter 228 of the slot 108 is equal to or greater than an outside diameter 212 of the satellite antenna reflector 208 and/or the satellite reflector cover 210 to prevent distortion thereof. In other words, the inside diameter 228 is greater than the diameter 212 of the satellite antenna reflector 208 to prevent crushing of the satellite antenna reflector 208 during installation.

In at least one embodiment, the width 216 between the first side wall 204 and the second side wall 206 may be sized based upon a total thickness of the satellite antenna reflector 208 and the reflector cover 210. As illustrated in FIG. 2, the satellite antenna reflector 208 has a first thickness 218, and the satellite reflector cover 210 has a second thickness 220. Thus, the width 216 of the slot 108 may correspond with the first thickness 218 and the second thickness 220 combined when the satellite reflector cover 210 engages a front surface 224 of the satellite antenna reflector 208.

As illustrated in FIG. 2, a back surface 226 of the satellite antenna reflector 208 engages the first wall side 204. Similarly, a front surface 222 of the satellite reflector cover 210 engages the second side wall 206. In at least one embodiment, the second side wall 206 comprises an underside profile configured to matingly engage the satellite reflector cover 210 to provide additional gripping force on the satellite reflector cover 210. More particularly, the second side wall 206, as well as the outer surface 202, may include a knurled pattern that provides a biting feature to engage the satellite reflector cover 210 and the flange of the satellite antenna reflector 208, providing shear holding strength in addition to the compression strength provided by the curvilinear body 102. The knurled pattern may optionally be provided along the inner surface of the first side wall 204 to matingly engage the back surface 226 of the satellite antenna reflector 208, providing similar holding strength as the second side wall 206.

Returning to FIG. 1, the securing apparatus 100 includes a locking mechanism 104 that is coupled to one or both of the confronting ring ends 110 and 112. The locking mechanism 104 is configured to releasably engage the confronting ring ends 110 and 112 to secure the confronting ring 110 and 112 ends together, locking one or more curvilinear devices within the curvilinear body 102. As illustrated in FIG. 1, the locking mechanism 104 comprises a pivoted tension lever. However, it is to be appreciated that other types of locking mechanisms 104 may also be utilized in accordance with the securing ring 100.

Figure 3:
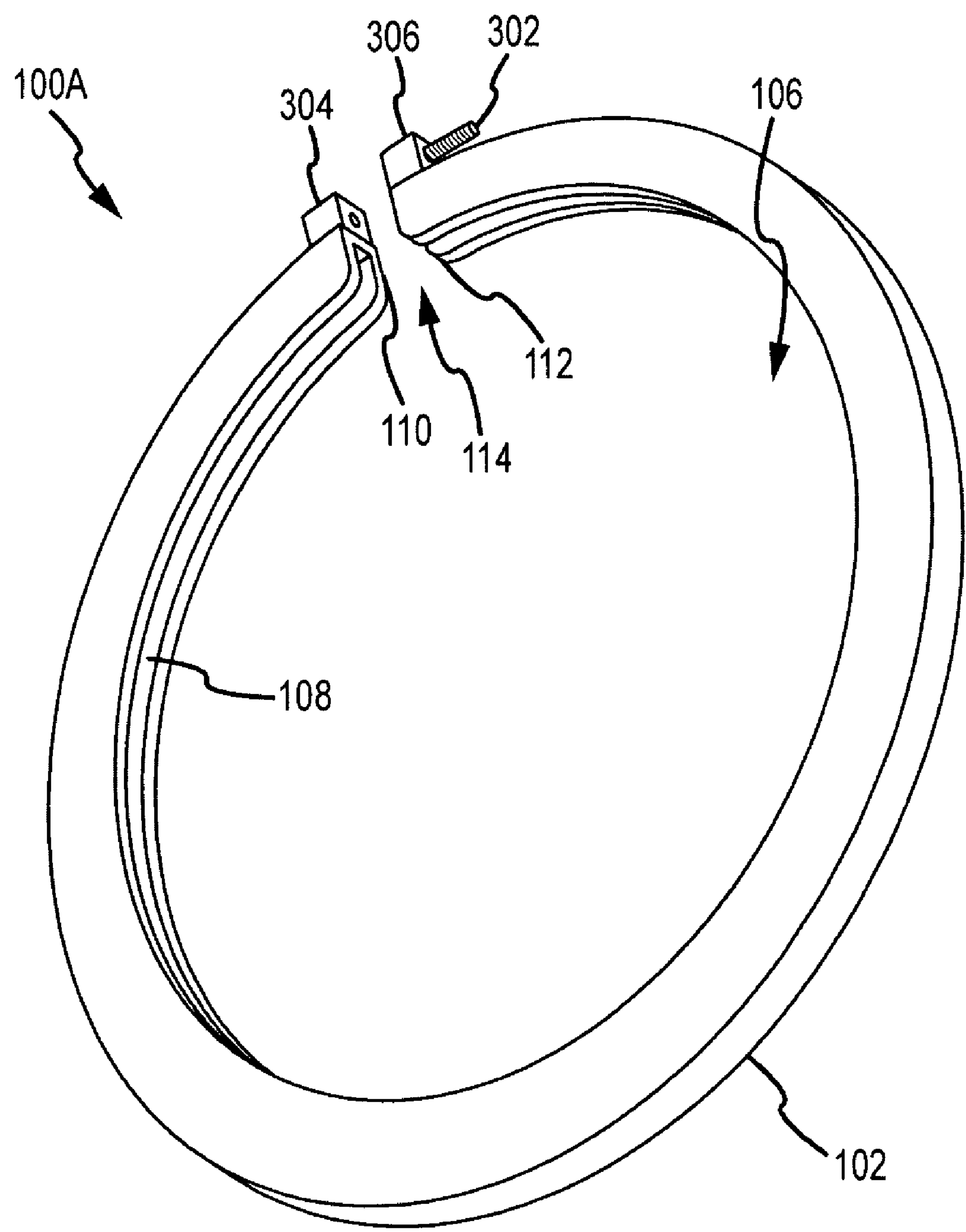
FIG. 3 illustrates an embodiment of a securing ring.

FIG. 3 illustrates an embodiment of a securing ring 100A. More particularly, FIG. 3 illustrates an alternative locking mechanism to the pivoted tension lever illustrated in FIG. 1. The discussion of components common to FIG. 1 will be omitted for the sake of brevity.

As illustrated in FIG. 3, a first threaded hole 304 is coupled to a first confronting ring end 110 of the curvilinear body 102. Similarly, a second threaded hole 306 is coupled to a second confronting ring end 112 of the curvilinear body 102. The screw 302 is inserted into and engages both the first threaded hole 304 and the second threaded hole 306 to secure the confronting ring ends 110 and 112 together. Other adjustable locking mechanisms, such as a worm drive, may also be utilized with the securing ring 100 of FIG. 1 as an alternative to the pivoted tension lever.

Thus, the securing ring 100A is capable of providing an adjustable clamping force on the satellite antenna reflector 208 (see FIG. 2) and the satellite reflector cover 210. Adjustable clamping forces may be utilized to secure various shapes of satellite antenna reflectors 208 and/or the satellite reflector covers 210. For example, a first clamping force may be utilized if the satellite antenna reflector 208 has a generally elliptical shape, whereas a second clamping force may be utilized if the satellite antenna reflector 208 has a generally circular shape.

Figure 4:
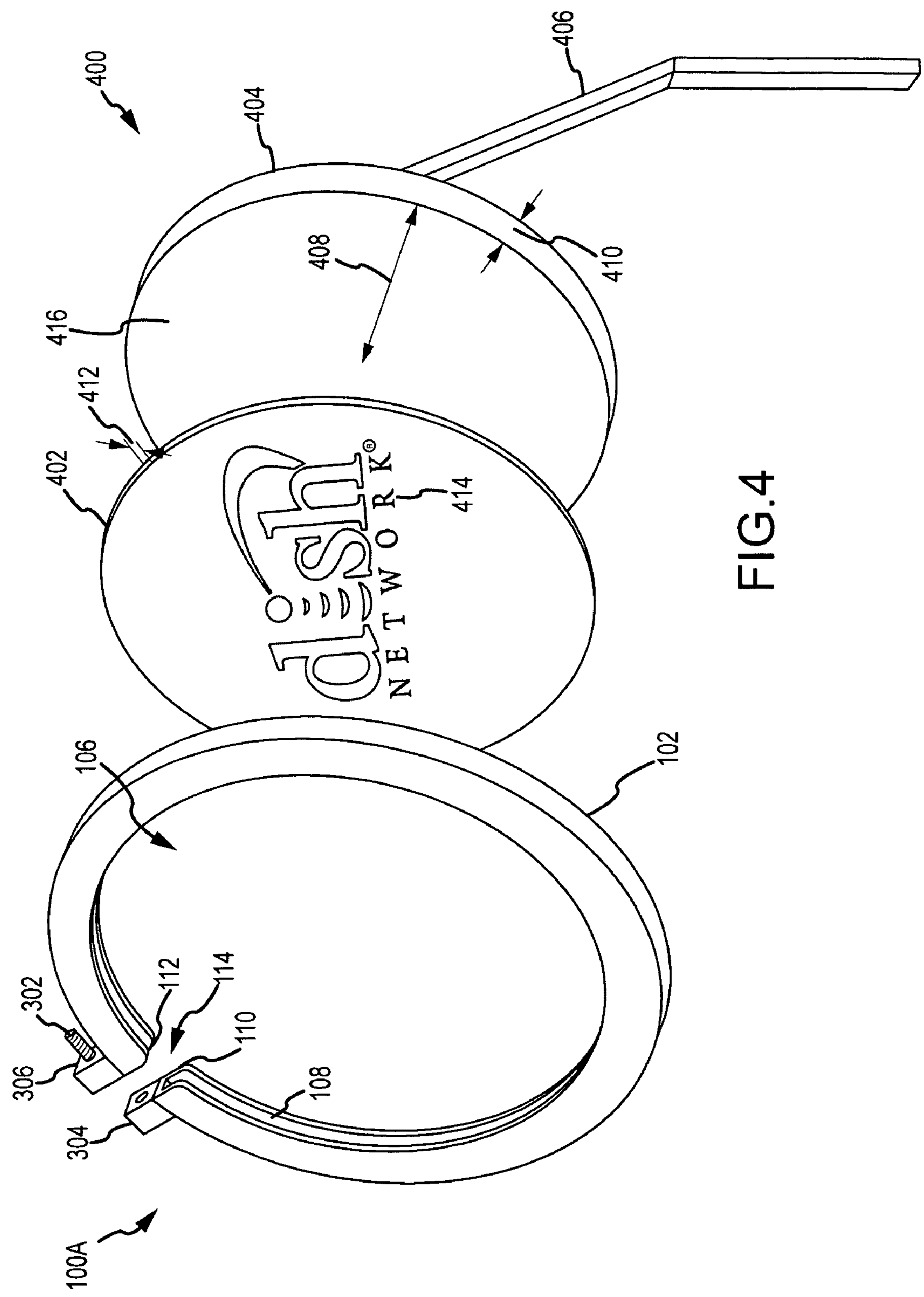
FIG. 4 illustrates an exploded view of an embodiment of an assembly incorporating the securing ring of FIG. 3.

As described above, a securing ring 100A of FIG. 3 may be utilized to secure a satellite reflector cover to a satellite antenna reflector. FIG. 4 illustrates an exploded view of an embodiment of an assembly 400 incorporating the securing ring 100A of FIG. 3. The assembly 400 includes a securing ring 100A, a satellite reflector cover 402, a satellite antenna reflector 404 and a mounting arm 406. Discussion of components common to FIG. 3 will be omitted for the sake of brevity.

The satellite antenna reflector 404 is attached to the mounting arm 406. The mounting arm 406 may be attached to portions of a structure, such as a roof or railing. The mounting arm 406 may also be mounted to other locations, such as poles or fences. In at least one embodiment, the satellite antenna reflector 404 is made of metal (e.g., steel). The satellite antenna reflector 404 has a concave cross sectional shape, an outer diameter 408 and a first thickness 410.

The reflector cover 402 is molded to match the contours of the satellite antenna reflector 404. The reflector cover 402 has a second thickness 412. The reflector cover 402 may have an ornamental design 414 printed thereon, such as a cartoon character, sports team logo, company logo and the like. In at least one embodiment, the reflector cover 402 is made of plastic.

Figure 5:
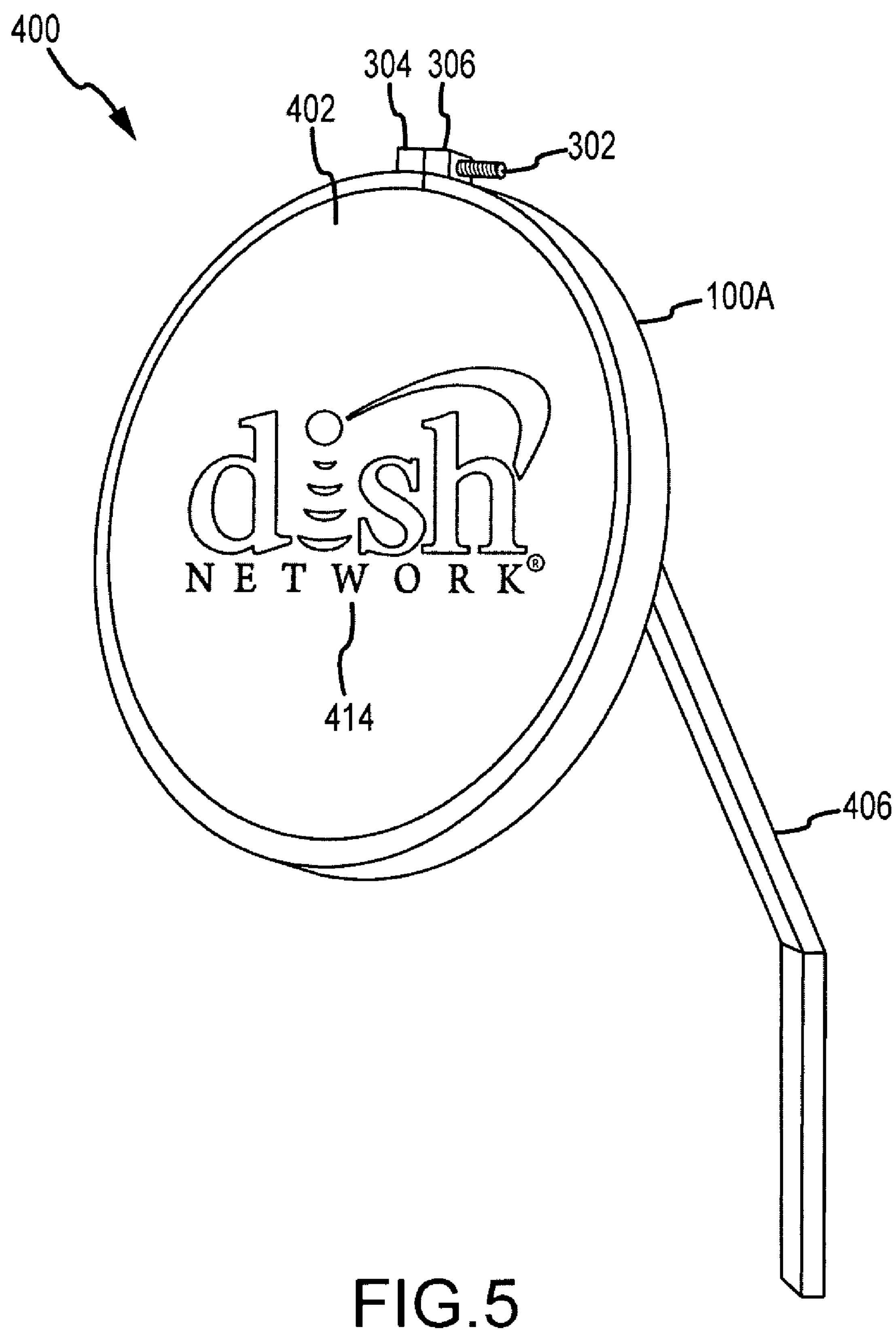
FIG. 5 illustrates an assembled view of the embodiment of the assembly of FIG. 4.

The reflector cover 402 is configured to attach to a front surface 416 of the satellite antenna reflector 404 to cover the satellite antenna reflector 404. The securing ring 100A is configured to attach around the satellite antenna reflector 404 and the reflector cover 402 when the securing ring 100A is in an open position, i.e., the confronting ring ends 110 and 112 are open to form the gap 114. The screw 302 is inserted into the threaded holes 304 and 306 and tightened to close the gap 114, securing together the reflector cover 402 and the satellite antenna reflector 404. FIG. 5 illustrates an assembled view of the embodiment of the assembly 400 of FIG. 4.

To avoid over tightening scenarios, the circumferential clamping should not be too strong as to potentially squeeze the flange of the satellite antenna reflector 404, distorting the functional front surface 416 of the satellite antenna reflector 404. Thus, a combination of a light tightening force in the circumferential clamping direction, the pinching of two materials together within the securing ring 100A, and the biting features previously described adequately address the possibility of over tightening and potential damage of the satellite antenna reflector 406.

Figure 6:
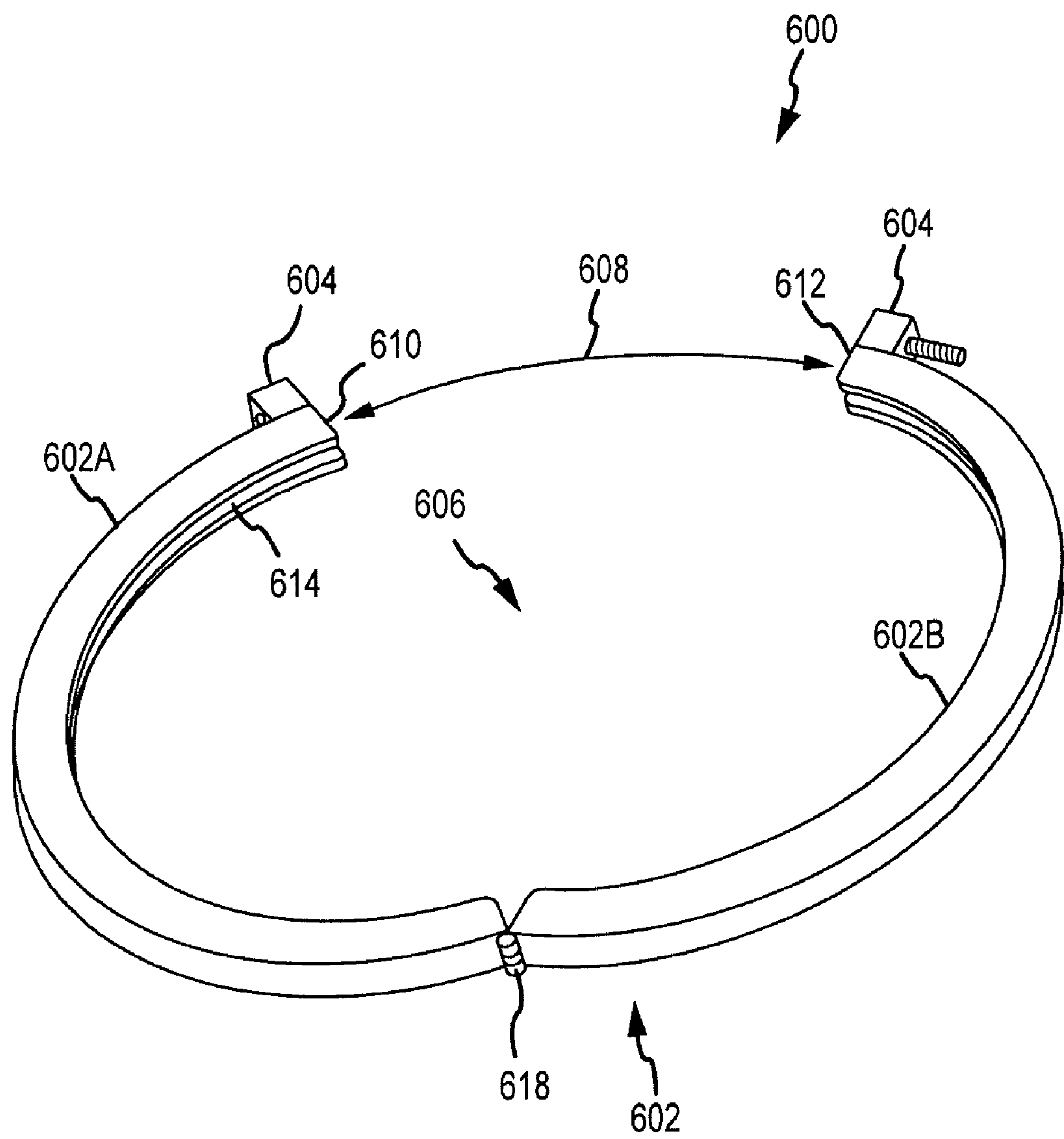
FIG. 6 illustrates an embodiment of a hinged securing ring.

In at least one embodiment, a securing ring may also be constructed of two or more segments coupled by a hinge. FIG. 6 illustrates an embodiment of a hinged securing ring 600. The securing ring 600 is configured to secure one or more elements within the securing ring 600. The securing ring 600 includes a curvilinear body 602 having first and second segments 602A and 602B, a locking mechanism 604 and a hinge 618. Each of these elements will be discussed in greater detail below.

The segments 602A and 602B define a ring opening 606 and are coupled together by the hinge 618. The segments 602A and 602B separate to form a gap 608 between the confronting ring ends 610 and 612 of the segments 602A and 602B2. The confronting ring ends 610 and 612 are separable to receive one or more curvilinear devices (not shown in FIG. 1) within the ring opening 606 of the curvilinear body 602.

The curvilinear body 602 further includes a slot 614 formed around the ring opening 606. The slot 614 is similar to the slot 108 of FIG. 1, and further discussion of the slot 614 is omitted for the sake of brevity. The securing ring 600 is moveable to an open position of the hinge 618 where the gap 608 is formed for receiving curvilinear devices within the curvilinear body 602. More particularly, curvilinear devices are placed within the slot 614 when the securing ring 600 is in an open position. The securing ring 600 is also moveable into a closed position of the hinge 618 that closes the gap 608. When the gap 608 is closed, the slot 614 exerts a clamping force on the curvilinear devices placed within the curvilinear body 602, securing a curvilinear device within the slot 614. The locking mechanism 604 may be engaged to secure together the first and second segments 602A and 602B, locking curvilinear devices, such as satellite antenna reflectors and reflector covers, within the securing ring 600.

Although specific embodiments were described herein, the scope of the invention is not limited to those specific embodiments. The scope of the invention is defined by the following claims and any equivalents therein.

What is claimed is:

1. A securing apparatus comprising:

a curvilinear body defining an opening and having a gap that defines confronting ring ends that are separable to receive at least one curvilinear device within the opening, the curvilinear body including an outer surface and opposing first and second side walls that define a slot therebetween, wherein the slot is configured for receiving the curvilinear device, and wherein the outer surface, the first wall and the second wall provide a clamping force on the curvilinear device in the slot when the confronting ring ends are drawn together, the clamping force securing the curvilinear device within the slot; and a locking mechanism coupled to the confronting ring ends and configured to releasably engage the confronting ring ends to secure the confronting ring ends together;

wherein the curvilinear device comprises a satellite antenna reflector.

2. The securing apparatus of claim 1, wherein the slot has an inside diameter equal to or greater than an outside diameter of the curvilinear device to prevent distortion thereof.

3. The securing apparatus of claim 1, wherein the locking mechanism is configured to provide an adjustable clamping force depending on a shape of the at least one curvilinear device.

4. The securing apparatus of claim 3, wherein the locking mechanism comprises:

a first threaded hole coupled to a first of the confronting ring ends;

a second threaded hole coupled to a second of the confronting ring ends and positioned to confront the first threaded hole; and a screw that engages both the first threaded hole and the second threaded hole to secure the confronting ring ends together.

5. The securing apparatus of claim 1, wherein the locking mechanism comprises a pivoted tension lever.

6. The securing apparatus of claim 1, wherein the first wall engages a back surface of the satellite antenna reflector and the second wall engages a front surface of a satellite antenna reflector cover.

7. The securing apparatus of claim 6, wherein the second wall comprises a knurled pattern that matingly engages the satellite antenna reflector cover.

8. The securing apparatus of claim 6, wherein a distance between the first wall and the second wall is sized based upon a total thickness of the satellite antenna reflector and the satellite reflector cover when the satellite reflector cover engages a front surface of the satellite antenna reflector.

9. An assembly comprising:

a satellite antenna reflector having a concave cross sectional shape, an outside diameter and a first thickness;

a satellite reflector cover configured to cover the reflector having a second thickness;

a securing ring configured to attach the cover to the reflector that comprises opposing segments separated by a gap, an opening diameter that is less than the outside diameter of the reflector, and a slot around the opening having an inside diameter corresponding to the outside diameter of the reflector and a width corresponding to the first thickness and the second thickness combined;

a locking mechanism attached to the ring operable to close the gap and secure the reflector to the cover; and the ring movable to an open position wherein the gap is formed for assembling the cover on the reflector or to a closed position wherein the gap is closed for attaching the cover to the reflector with a clamping force exerted on the ring.

10. The assembly of claim 9, wherein the opposing segments comprises a unitary body.

11. The assembly of claim 9, wherein the opposing segments are coupled by a hinge.

12. The assembly of claim 9, wherein the outside diameter of the reflector and the opening in the ring are substantially circular.

13. The assembly of claim 9, wherein the outside diameter of the reflector and the opening in the ring are substantially elliptical.

14. The assembly of claim 9, wherein the locking mechanism comprises a pivoted tension lever.

15. The assembly of claim 9, wherein the locking mechanism is configured to provide a first clamping force if the satellite antenna reflector has a circular shape, and wherein the locking mechanism is configured to provide a second clamping force if the satellite antenna reflector has an elliptical shape.

16. The assembly of claim 15, wherein the locking mechanism comprises:

a first threaded hole coupled to a first of the confronting ring ends;

a second threaded hole coupled to a second of the confronting ring ends and positioned to confront the first threaded hole; and a screw that engages both the first threaded hole and the second threaded hole to secure the confronting ring ends together.

17. The securing apparatus of claim 9, wherein the second wall comprises a knurled pattern that matingly engages the satellite antenna reflector cover.

18. A securing apparatus comprising:

a curvilinear body having at least two segments coupled together by a hinge, the at least two segments defining an opening and having a gap that defines confronting ring ends of the segments that are separable to receive at least one curvilinear device within the opening, the curvilinear body including an outer surface and opposing first and second side walls that define a slot therebetween, wherein the slot is configured for receiving the curvilinear device, and wherein the outer surface, the first wall and the second wall provide a clamping force on the curvilinear device in the slot when the confronting ring ends are drawn together, the clamping force securing the curvilinear device within the slot; and a locking mechanism coupled to the, confronting ring ends and configured to releasably engage the confronting ring ends to secure the confronting ring ends together;

wherein the curvilinear device comprises a satellite antenna reflector.

19. The securing ring of claim 18, wherein the locking mechanism comprises a pivoted tension lever.

* * * * *